United States Patent
Furukawa et al.

(10) Patent No.: US 7,422,784 B2
(45) Date of Patent: *Sep. 9, 2008

(54) SILICON CARBIDE BASED POROUS MATERIAL AND METHOD FOR PREPARATION THEREOF, AND HONEYCOMB STRUCTURE

(75) Inventors: Masahiro Furukawa, Nagoya (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 310 days.

This patent is subject to a terminal disclaimer.

(21) Appl. No.: 10/537,765

(22) PCT Filed: Dec. 10, 2003

(86) PCT No.: PCT/JP03/15796

§ 371 (c)(1), (2), (4) Date: Jun. 6, 2005

(87) PCT Pub. No.: WO2004/052805

PCT Pub. Date: Jun. 24, 2004

(65) Prior Publication Data
US 2006/0121239 A1    Jun. 8, 2006

(30) Foreign Application Priority Data
Dec. 11, 2002 (JP) ............................. 2002-359128

(51) Int. Cl.
*B32B 3/12* (2006.01)
*B22F 3/11* (2006.01)

(52) U.S. Cl. .................. 428/116; 428/307.3; 419/2
(58) Field of Classification Search ............. 428/304.4, 428/312.6, 698, 699, 317.9, 403, 116, 446, 428/307.3; 423/343, 430, 439; 419/2, 41
See application file for complete search history.

(56) References Cited

U.S. PATENT DOCUMENTS

| | | | |
|---|---|---|---|
| 4,729,972 A * | 3/1988 | Kodama et al. | 501/91 |
| 6,143,207 A * | 11/2000 | Yamada et al. | 252/515 |
| 6,510,701 B2 | 1/2003 | Kato et al. | |
| 6,777,114 B2 | 8/2004 | Tomita et al. | |

(Continued)

FOREIGN PATENT DOCUMENTS

EP          0 322 998 A2    7/1989

(Continued)

*Primary Examiner*—Gwendolyn Blackwell
*Assistant Examiner*—Lauren E Robinson
(74) *Attorney, Agent, or Firm*—Oliff & Berridge, PLC

(57) ABSTRACT

A silicon carbide based porous material (1) containing silicon carbide particles (2) as an aggregate and metallic silicon (3) as a bonding material and having a number of pores (5) formed by them, characterized in that it has an oxide phase (4) in at least a part of the pore (5), and the oxide phase (4) contains respective oxides of silicon, aluminum and an alkaline earth metal and contains substantially no alkaline earth metal silicate crystal phase; a method for producing the above porous material; and a honeycomb structure comprising the silicon carbide based porous material. The above porous material is capable of effectively inhibiting the corrosion by an acid (especially acetic acid) used in the operation of carrying a catalyst, that is, is improved in the resistance to an acid.

8 Claims, 1 Drawing Sheet

U.S. PATENT DOCUMENTS

| | | | |
|---|---|---|---|
| 7,037,477 B2 * | 5/2006 | Tomita et al. | 423/345 |
| 7,244,685 B2 * | 7/2007 | Furukawa et al. | 501/88 |
| 2002/0066233 A1 * | 6/2002 | McArdle et al. | 51/308 |
| 2003/0134084 A1 | 7/2003 | Ichikawa et al. | |
| 2005/0158534 A1 * | 7/2005 | Tabuchi et al. | 428/304.4 |

FOREIGN PATENT DOCUMENTS

| | | |
|---|---|---|
| EP | 0 369 330 A2 | 5/1990 |
| EP | 1 340 735 A1 | 9/2003 |
| EP | 1 375 454 A1 | 1/2004 |
| EP | 1 568 669 A1 | 8/2005 |
| JP | A 06-182228 | 7/1994 |
| JP | A 2002-061989 | 2/2002 |
| JP | A 2002-154882 | 5/2002 |
| JP | A 2002-201082 | 7/2002 |
| JP | WO-02/081406 * | 10/2002 |
| JP | A 2002-356384 | 12/2002 |
| JP | WO-03/082770 * | 10/2003 |
| JP | WO-2004/046063 * | 3/2004 |
| WO | WO 02/40423 A1 | 5/2002 |
| WO | WO 02/081406 A1 | 10/2002 |

\* cited by examiner

SILICON CARBIDE BASED POROUS MATERIAL AND METHOD FOR PREPARATION THEREOF, AND HONEYCOMB STRUCTURE

TECHNICAL FIELD

The present invention relates to a silicon carbide porous body, a method of manufacturing the same, and a honeycomb structure. More particularly, the present invention relates to a silicon carbide porous body which is effectively inhibited from being corroded by an acid (particularly acetic acid) used for loading a catalyst on the body to exhibit improved acid resistance, a method of manufacturing the same, and a honeycomb structure including the silicon carbide porous body.

BACKGROUND ART

As a filter for trapping and removing particulate matter contained in dust-containing fluid such as exhaust gas discharged from a diesel engine (diesel particulate filter (DPF)), or a catalyst carrier for supporting a catalyst component for purifying a toxic substance contained in exhaust gas, a porous honeycomb structure including cell partition walls (ribs), which form a group of adjacent cells, and a honeycomb outer wall, which encloses and holds the outermost circumferential cells located at the outer circumference of the cell composite, has been widely used. As a material for the honeycomb structure, refractory silicon carbide (SiC) has been used.

A DPF using a regeneration method in which an oxidizing catalyst is loaded on a DPF and deposited particulates are oxidized and burned to effect continuous regeneration (catalytic regeneration DPF) has also been developed.

As such a honeycomb structure, a porous silicon carbide catalyst carrier having a honeycomb structure obtained by forming silicon carbide having a predetermined specific surface area and containing impurities as a starting material into a desired shape, drying the formed product, and firing the dried product in the temperature range of 1600 to 2200° C. has been disclosed (see JP-A-6-182228, for example).

In the sintering mode (necking) of the catalyst carrier disclosed in JP-A-6-182228 utilizing the recrystallization reaction of silicon carbide particles, the silicon carbide component is evaporated from the surface of the silicon carbide particles and condenses at the contact section (neck section) between the particles, whereby the neck section is grown to obtain a bonding state. However, since an extremely high firing temperature is required to evaporate the silicon carbide, cost is increased. Moreover, since it is necessary to fire the material having a high coefficient of thermal expansion at a high temperature, firing yield is decreased.

In the case of manufacturing a filter having a high porosity (particularly a filter having a porosity of 50% or more) by sintering utilizing the recrystallization reaction of the silicon carbide particles, the growth of the neck section is hindered since the sintering mechanism does not sufficiently function, whereby the strength of the filter is decreased.

As a related-art technology for solving these problems, a porous honeycomb structure including refractory particles (particularly silicon carbide) as an aggregate and metal silicon and a method of manufacturing the same have been disclosed (see JP-A-2002-201082, for example). According to such a manufacturing method, a porous honeycomb structure can be inexpensively manufactured at a relatively low firing temperature, and the resulting porous honeycomb structure has characteristics such as a high porosity, high thermal conductivity, and high strength.

In order to improve the strength and the oxidation resistance (during abnormal combustion or the like) of the honeycomb structure, a technology of forming an oxygen-containing phase on the surfaces of silicon carbide and metal silicon by using a method of (1) oxidizing a silicon carbide raw material and metal silicon in air in advance or oxidizing the materials in a calcinating stage, (2) subjecting the product obtained after firing to a heat treatment in an oxygen-containing atmosphere, (3) coating the surface of the honeycomb structure using a solution containing silicon and oxygen, or the like has been proposed (see JP-A-2002-154882, for example).

In order to further improve the strength of the honeycomb structure in comparison with the above-mentioned related-art technologies, there has been proposed a method of adding an alkaline earth metal (calcium or strontium) having an eutectic point of 1200 to 1600° C. to an oxide film (silicon dioxide) on the surfaces of silicon carbide as an aggregate and metal silicon, and melting and removing the oxide film to improve wettability between the silicon carbide and the metal silicon, thereby thickening the joint section between the silicon carbide and the metal silicon (Japanese Patent Application No. 2002-61989). According to this method, a honeycomb structure having excellent strength can be obtained. However, the addition of calcium causes formation of a calcium silicate (alkaline earth metal silicate) crystal phase in the oxide phase after firing and dissolved in acetic acid used when causing the honeycomb structure to carry a catalyst, whereby a solution (solution in which catalyst is dissolved in acid) is contaminated. This problem was solved by replacing calcium with strontium. However, a strontium silicate (alkaline earth metal silicate) crystal phase is formed in the same manner as in the case of using calcium, depending the amount of strontium added and the firing conditions, and dissolved in acetic acid, resulting in poor acid (acetic acid) resistance.

DISCLOSURE OF THE INVENTION

The present invention provides a silicon carbide porous body which is effectively inhibited from being corroded by an acid (particularly acetic acid) used for loading a catalyst on the body to exhibit improved acid resistance, a method of manufacturing the same, and a honeycomb structure including the silicon carbide porous body.

According to the present invention, the following silicon carbide porous body, a method of manufacturing the same, and a honeycomb structure can be provided.

[1] A silicon carbide porous body, in which silicon carbide particles as an aggregate and metal silicon as a bonding material are bonded so that pores are formed between the silicon carbide particles, the silicon carbide porous body comprising an oxide phase in at least a part of each pore, wherein the oxide phase includes oxides of silicon, aluminum, and an alkaline earth metal, and the oxide phase does not substantially include an alkaline earth metal silicate crystal phase.

[2] The silicon carbide porous body as defined in [1], wherein the oxide phase is provided on a surface of the silicon carbide particles and/or a surface of the metal silicon.

[3] The silicon carbide porous body as defined in [1] or [2], wherein the oxide of silicon is silicon dioxide ($SiO_2$), the oxide of aluminum is dialuminum trioxide ($Al_2O_3$), and the oxide of an alkaline earth metal is calcium oxide (CaO) or strontium oxide (SrO).

[4] The silicon carbide porous body as defined in [3], wherein the oxide phase includes the dialuminum trioxide in an amount of 5.0 to 50.0 mol % of the entire oxide phase in molar ratio.

[5] The silicon carbide porous body as defined in any of [1] to [4], wherein the oxide phase includes silicon dioxide, dialuminum trioxide, and the oxide of an alkaline earth metal, the oxide phase being an amorphous phase or a crystal phase including dialuminum trioxide in a crystal structure.

[6] The silicon carbide porous body as defined in [5], wherein the crystal phase includes cordierite, anorthite, or strontium feldspar ($SrAl_2Si_2O_8$).

[7] A honeycomb structure, comprising the silicon carbide porous body as defined in any of [1] to [6].

[8] A method of manufacturing a silicon carbide porous body, the method comprising: adding compounds containing silicon, aluminum, and an alkaline earth metal to silicon carbide particles and metal silicon to obtain a raw material, forming the resulting raw material into a predetermined shape, and calcinating and firing the resulting formed product to obtain a porous body including an oxide phase including oxides of silicon, aluminum, and an alkaline earth metal on at least a part of a surface of the silicon carbide particles and/or the metal silicon and having a content of dialuminum trioxide ($Al_2O_3$) of 5.0 to 50.0 mol % of the entire oxide phase in molar ratio.

BEST MODE FOR CARRYING OUT THE INVENTION

Figure 1:
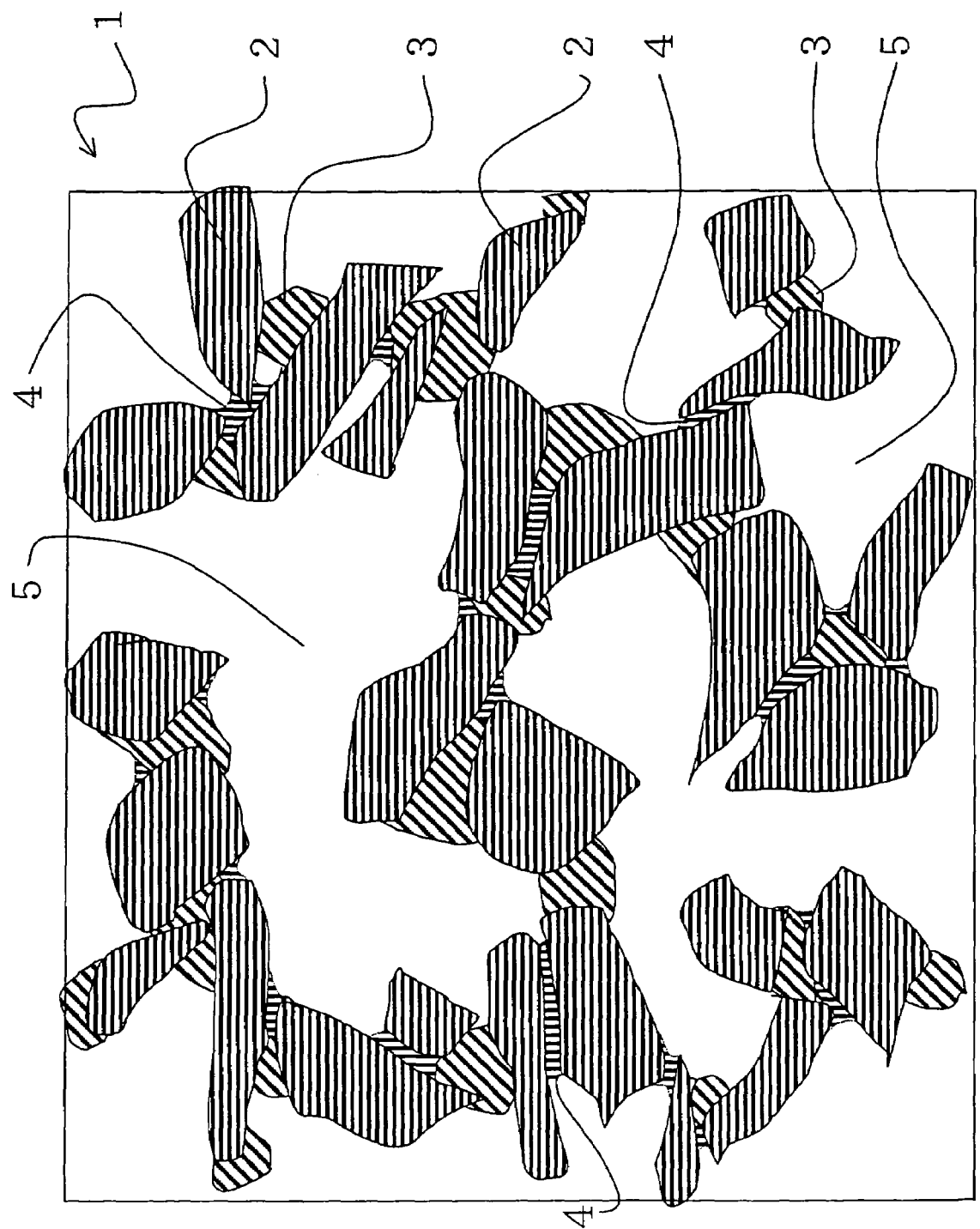
FIG. 1 is an enlarged cross-sectional diagram of a part of a cross section cut at an arbitrary surface showing one embodiment of a silicon carbide porous body of the present invention.

Since the silicon carbide porous body of the present invention includes the oxide phase in at least a part of each pore, and the oxide phase includes oxides of silicon, aluminum and an alkaline earth metal, and the oxide phase does not substantially include an alkaline earth metal silicate crystal phase, the oxide phase is not dissolved in an acid (particularly acetic acid) used for loading a catalyst on the body to exhibit improved acid resistance, whereby contamination of a solution (solution in which catalyst is dissolved in acid) used for loading a catalyst on the body is inhibited. Since the oxide film ($SiO_2$ or the like) on the surfaces of the silicon carbide particles and the metal silicon can be easily melted and removed by decreasing the eutectic point of the oxide phase by making the oxide phase a ternary oxide phase made up of oxides of silicon, aluminum, and an alkaline earth metal, wettability of the metal silicon can be improved, whereby the strength of the silicon carbide porous body is increased. In the method of manufacturing the silicon carbide porous body of the present invention, since the compounds containing silicon, aluminum, and an alkaline earth metal are added so that the value obtained by converting the total amount of aluminum contained in the compounds into the amount of dialuminum trioxide ($Al_2O_3$) containing an equal amount of aluminum is 5.0 mol % or more of the entire oxide phase formed after firing, formation of an alkaline earth metal silicate crystal phase can be inhibited. The compounds containing silicon, aluminum, and an alkaline earth metal used herein include silicon dioxide, Al, Ca, and the like contained in the silicon carbide particles and the metal silicon as impurities. Since the compounds are added so that the value obtained by converting the total amount of aluminum into the amount of dialuminum trioxide is 50 mol % or less of the entire oxide phase, the eutectic point of the ternary oxide phase can be sufficiently decreased, whereby the strength can be improved. Moreover, since the honeycomb structure includes the silicon carbide porous body of the present invention, the acid resistance of the honeycomb structure is improved, whereby contamination of a solution used when causing the honeycomb structure to carry a catalyst can be inhibited.

Embodiments of the present invention are described below. However, the present invention is not limited to the following embodiments. Various modifications and improvements of design may be made based on knowledge of a person skilled in the art without departing from the scope and spirit of the present invention.

FIG. 1 is an enlarged cross-sectional diagram of a part of a cross section cut at an arbitrary surface showing one embodiment of the silicon carbide porous body of the present invention.

As shown in FIG. 1, a silicon carbide porous body 1 in this embodiment, in which silicon carbide particles 2 as an aggregate and metal silicon 3 as a bonding material are bonded so that pores 5 are formed between the silicon carbide particles 2, includes an oxide phase 4 in at least a part of each pore 5. It suffices that the oxide phase 4 be included in at least a part of each pore 5. As shown in FIG. 1, it is preferable that the oxide phase 4 be disposed on the surface of the silicon carbide particles 2 and/or the surface of the metal silicon 3 in the shape of a film inside the pore formed by the silicon carbide particles 2 and the metal silicon 3. The oxide phase 4 may not be disposed in the shape of a film, and the minute pores 5 may be filled with the oxide phase 4, for example. However, it is preferable that the average pore size and the porosity be not too small. In this embodiment, the oxide phase 4 includes silicon dioxide ($SiO_2$), dialuminum trioxide ($Al_2O_3$), and strontium oxide (SrO), and does not substantially include an alkaline earth metal silicate crystal phase ($SrSiO_3$ or the like). Whether or not the oxide phase 4 substantially includes an alkaline earth metal silicate crystal phase can be confirmed by identifying the crystal phase of the oxide phase 4 (oxide crystal phase) using X-ray diffraction (presence or absence of X-ray diffraction of $SrSiO_3$ or the like). The statement "does not substantially include an alkaline earth metal silicate crystal phase" means that the X-ray diffraction pattern of an alkaline earth metal silicate ($SrSiO_3$ or the like) crystal phase is not confirmed in high-resolution X-ray diffraction measurement, for example. The statement "does not substantially include an alkaline earth metal silicate crystal phase" also includes the case where, even if the oxide phase 4 includes silicon dioxide ($SiO_2$) and strontium oxide (SrO) in the composition, the oxide phase 4 forms an amorphous oxide phase and/or an oxide crystal phase including aluminum other than an alkaline earth metal silicate, such as strontium feldspar ($SrAl_2Si_2O_8$), due to inclusion of dialuminum trioxide ($Al_2O_3$). It suffices that the silicon dioxide be an oxide of silicon and the dialuminum trioxide be an oxide of aluminum. It suffices that the strontium oxide be an oxide of an alkaline earth metal. In more detail, it suffices that the strontium oxide be an oxide of at least one alkaline earth metal selected from the group consisting of magnesium, calcium, strontium, and barium (e.g. MgO, CaO, or the like). In this case, the alkaline earth metal may be only one type, or different types of alkaline earth metals may be mixed. The alkaline earth metal silicate crystal phase refers to any alkaline earth metal silicate which does not contain aluminum, such as $CaSiO_3$, $Ca_2SiO_4$, or $SrSiO_3$.

In the present invention, whether or not the oxide phase 4 substantially includes the alkaline earth metal silicate crystal phase may be confirmed by measuring the X-ray diffraction pattern of a specimen using a high-resolution powder X-ray diffractometer (HR-XRD) "RINT-2500" manufactured by Rigaku Corporation under predetermined conditions (X-rays: Cu Kα1, tube voltage: 50 kV, tube current: 300 mA, counter: scintillation counter, goniometer: RINT 2000 wide-angle goniometer, attachment: ASC-6S, counter monochromator: full-automatic monochromator, divergence slit: 1 deg, scattering slit: 1 deg, receiving slit: 0.3 mm, scan mode: continuous, scan speed: 2°/min, scan step: 0.02°, scan axis: 2θ/θ), and confirming whether or not the diffraction line of an alkaline earth metal silicate crystal phase is observed in the resulting diffraction pattern, for example. Even if a trace of an alkaline earth metal silicate crystal phase in an amount equal to or less than the detection limit of the above device is included, it is determined that "the oxide phase 4 does not substantially include an alkaline earth metal silicate crystal phase" when the X-ray diffraction pattern of an alkaline earth metal silicate crystal phase is not observed.

The silicon carbide porous body 1 in this embodiment configured as described above is used as a filter for carrying a catalyst component and removing a toxic substance or the like.

Since the silicon carbide porous body 1 in this embodiment includes the oxide phase 4 in at least a part of each pore 5, and the oxide phase 4 includes oxides of silicon, aluminum and an alkaline earth metal, and the oxide phase 4 does not substantially include an alkaline earth metal silicate crystal phase, the oxide phase is not dissolved in an acid (particularly acetic acid) used for loading a catalyst on the body 1 to exhibit improved acid resistance, whereby contamination of a solution used for loading a catalyst on the body 1 is inhibited. Specifically, when a catalyst is loaded on the silicon carbide porous body 1, the catalyst is dissolved in an acid (acetic acid or the like), and the solution is applied to the silicon carbide porous body 1, for example. In this case, since an alkaline earth metal silicate crystal phase does not substantially exist in the silicon carbide porous body 1, the oxide phase is not dissolved in the acid (acetic acid or the like), whereby corrosion of the silicon carbide porous body 1 is inhibited.

Since the silicon carbide porous body 1 in this embodiment includes the silicon carbide particles 2 as an aggregate and the metal silicon 3, the silicon carbide porous body 1 can be sintered at a relatively low firing temperature during the manufacturing, whereby manufacturing cost is reduced and manufacturing yield is improved. Since the metal silicon 3 is used to bond the silicon carbide particles 2 which are refractory particles, the silicon carbide porous body 1 exhibits high thermal conductivity. Therefore, when the silicon carbide porous body 1 is used for a DPF, a local increase in temperature which may cause damage to the filter rarely occurs even if deposited particulates are burned for filter regeneration.

Since the silicon carbide porous body 1 includes the oxide phase 4 including oxides of silicon, aluminum, and an alkaline earth metal in at least a part of each pore 5, oxidation and decomposition of the silicon carbide particles 2 and the metal silicon 3 are inhibited even if the silicon carbide porous body 1 is subjected to a high temperature in a low oxygen atmosphere encountering when used as a DPF. Specifically, since the silicon carbide porous body in this embodiment exhibits excellent strength, oxidation resistance, and thermal shock resistance, generation of heat due to oxidation of the silicon carbide and the metal silicon during filter regeneration rarely occurs, whereby the filter is damaged to only a small extent. It is preferable that the oxide phase 4 be provided on the surface of the silicon carbide particles 2 and/or the surface of the metal silicon 3. This further improves strength, oxidation resistance, and thermal shock resistance.

In the silicon carbide porous body 1 in this embodiment, the dialuminum trioxide is included in the oxide phase 4 in an amount of preferably 5.0 to 50.0 mol %, still more preferably 7.0 to 40.0 mol %, and particularly preferably 8.0 to 35.0 mol % of the entire oxide phase in molar ratio. If the content of the dialuminum trioxide is 5.0 mol % or more, formation of an alkaline earth metal silicate formed from the alkaline earth metal oxide and the silicon dioxide included in the oxide phase 4 can be inhibited (amorphized). If the content of the dialuminum trioxide is equal to or greater than a specific value, a part or the entirety of the oxide phase 4 may form a crystal phase including dialuminum trioxide in the crystal structure, such as a cordierite crystal, anorthite crystal, or strontium feldspar ($SrAl_2Si_2O_8$). Since the amorphous phase including aluminum and the crystal phase including dialuminum trioxide in the crystal structure, which are formed in place of an alkaline earth metal silicate crystal phase, are not dissolved in an acid (particularly acetic acid) used for loading a catalyst on the body 1, the acid (acetic acid) resistance of the silicon carbide porous body 1 is improved. In order to melt and remove the oxide film ($SiO_2$ or the like) on the surfaces of the silicon carbide particles and the metal silicon to improve wettability of the metal silicon by reducing the eutectic point of the oxide phase 4 made up of oxides of silicon, aluminum, and an alkaline earth metal as a ternary oxide phase, the dialuminum trioxide is included in the oxide phase 4 in an amount of preferably 5.0 to 50.0 mol %, still more preferably 7.0 to 40.0 mol %, and particularly preferably 8.0 to 35.0 mol %.

If the content of the dialuminum trioxide is less than 5.0 mol %, the dialuminum trioxide may not be sufficiently diffused in the oxide phase 4, whereby formation of an alkaline earth metal silicate crystal phase may not be prevented. If the content of the dialuminum trioxide is greater than 50.0 mol %, the eutectic point of the oxide phase 4 may not be sufficiently decreased, whereby wettability between the silicon carbide particles and the metal silicon may be decreased.

It is preferable that the content of the silicon dioxide in the oxide phase 4 be 10.0 to 70.0 mol % from the viewpoint of decreasing the eutectic point of the oxide phase 4. If the content is less than 10 mol % or greater than 70.0 mol %, the eutectic point of the oxide phase 4 may not be sufficiently decreased. It is preferable that the content of the alkaline earth metal oxide in the oxide phase 4 be 10.0 to 70.0 mol % from the viewpoint of decreasing the eutectic point of the oxide phase 4. If the content is less than 10 mol % or greater than 70.0 mol %, the eutectic point of the oxide phase 4 may not be sufficiently decreased.

The ratio of the amount of the silicon dioxide, dialuminum trioxide, and alkaline earth metal oxide in the oxide phase 4 may be calculated from values obtained by converting each element contained in the compounds containing silicon, aluminum, and alkaline earth metal to be added and aluminum, calcium, and the like contained in the metal silicon as impurities into respective oxides, and values obtained by converting the amount of silicon dioxide contained in the oxide film on the surface of the silicon carbide particles and/or the metal silicon from the amount of oxygen determined by chemically analyzing the raw material powder. These values may also be calculated by determining the amount of each element by measuring characteristic X-rays specific to silicon, aluminum, and alkaline earth metal by EDS point analysis or the like of the oxide phase 4 present on the ground surface of the resulting silicon carbide porous body 1, or determining the amount of each element by predetermined chemical analysis or the like. The measurement method is not limited to those described above.

One embodiment of the method of manufacturing the silicon carbide porous body of the present invention is described below.

In the method of manufacturing the silicon carbide porous body in this embodiment, predetermined amounts of compounds containing silicon, aluminum, and an alkaline earth metal are added to silicon carbide particles and metal silicon. A pore-forming agent or the like is arbitrarily added to the mixture to obtain a raw material mixture.

After the addition of a forming agent such as an organic binder to the raw material mixture, as required, the components are mixed to obtain forming clay.

The compounds containing silicon, aluminum, and alkaline earth metal in the clay are added so that the content of dialuminum trioxide is 5.0 to 50.0 mol % of the entire oxide phase including oxides of silicon, aluminum, and an alkaline earth metal and provided on at least a part of the surface of the silicon carbide particles and/or the metal silicon of the silicon carbide porous body obtained after firing. The amount of addition may be calculated from values obtained by converting each element contained in the compounds containing silicon, aluminum, and alkaline earth metal to be added and aluminum, calcium, and the like contained in the metal silicon as impurities into respective oxides, and values obtained by converting the amount of silicon dioxide contained in the oxide film on the surface of the silicon carbide particles and/or the metal silicon from the amount of oxygen determined by chemically analyzing the raw material powder. The alkaline earth metal contained in the compound to be added is preferably contained in the form of a monoxide or carbonate, such as strontium oxide (SrO) or strontium carbonate ($SrCO_3$), since the oxide phase can be efficiently formed and these compounds are easily available and handled. The aluminum is preferably contained in the form of dialuminum trioxide ($Al_2O_3$) or metal aluminum (Al). In this case, metal aluminum may be contained as impurities in the metal silicon. The silicon is preferably contained in the form of silicon dioxide ($SiO_2$) or colloidal silica. In this case, silicon dioxide may be contained as an oxide film which covers the surfaces of the silicon carbide particles and the metal silicon. As the pore-forming agent, an organic pore-forming agent such as starch or a foamed resin may be used.

The resulting clay is formed into a predetermined shape such as a honeycomb shape. The resulting formed product is calcinated to remove the organic binder in the formed product (debinding), and then fired to obtain a silicon carbide porous body.

In the method of manufacturing the silicon carbide porous body in this embodiment, since the content of the dialuminum trioxide after aluminum contained in the compound added and aluminum contained in the metal silicon are converted into dialuminum trioxide is adjusted to 5.0 to 50.0 mol % of the entire oxide phase, an amorphous phase including aluminum and/or a crystal phase including dialuminum trioxide in the crystal structure is formed in the oxide phase, whereby formation of an alkaline earth metal silicate crystal phase can be inhibited. Since the amorphous phase including aluminum and the crystal phase including dialuminum trioxide in the crystal structure are not dissolved in an acid (particularly acetic acid) used for loading a catalyst, a silicon carbide porous body having improved acid (acetic acid) resistance can be manufactured.

In the method of manufacturing the silicon carbide porous body in this embodiment, it is preferable to perform calcinating at a temperature lower than the melting temperature of the metal silicon. In more detail, the formed product may be held at a predetermined temperature of about 150 to 700° C., or the formed product may be calcinated in a predetermined temperature range at a temperature rise rate as low as 50° C./hr or less. In the case of holding the formed product at a predetermined temperature, the formed product may be held at only one temperature level or a plurality of temperature levels depending on the type and the amount of the organic binder. In the case of holding the formed product at a plurality of temperature levels, the holding time at each temperature level may be the same or different. In the case of decreasing the temperature rise rate, the temperature rise rate may be decreased within only one temperature range or over a plurality of temperature ranges. In the case of decreasing the temperature rise rate over a plurality of temperature ranges, the temperature rise rate in each temperature range may be the same or different.

It is necessary to soften the metal silicon during firing in order to cause the resulting silicon carbide material to have a porous structure in which the refractory particles included therein are bonded through the metal silicon. Since the melting point of the metal silicon is 1410° C., it is preferable to set the firing temperature at 1410° C. or more. An optimum firing temperature is determined depending on the microstructure and the characteristic values. If the firing temperature exceeds 1600° C., bonding through the metal silicon becomes difficult due to progress of vaporization of the metal silicon. Therefore, the firing temperature is preferably 1410 to 1600° C., and still more preferably 1420 to 1580° C.

One embodiment of the honeycomb structure of the present invention is described below.

The honeycomb structure in this embodiment is a structure formed of the silicon carbide porous body of the present invention, and including a plurality of cells functioning as fluid channels. The shape of the honeycomb structure is not particularly limited. For example, the honeycomb structure has a columnar structure. The cross-sectional shape cut at a plane perpendicular to the axial direction of the columnar structure is polygonal (such as quadrangular), circular, elliptical, oval, unsymmetrical, or the like. The cross-sectional shape of the cell is not particularly limited. The cross-sectional shape of the cell is triangular, quadrangular, hexagonal, circular, or the like. The density of the cells functioning as fluid channels is not particularly limited. An optimum cell density may be selected depending on the application. The honeycomb structure in this embodiment exhibits excellent acid (acetic acid) resistance, oxidation resistance, particulate reaction resistance, and thermal shock resistance due to the characteristics of the silicon carbide porous body of the present invention as the constituent material. The honeycomb structure of the present invention may be used under high space velocity (SV) conditions as a DPF, catalyst regeneration DPF, catalyst carrier, or the like.

In the method of manufacturing the honeycomb structure in this embodiment, clay is formed into a honeycomb shape by extrusion or the like in the above-described embodiment of the method of manufacturing the silicon carbide porous body of the present invention when forming the clay into a predetermined shape. The resulting formed product is calcinated and then fired to obtain a honeycomb structure formed of the silicon carbide porous body.

EXAMPLE

Examples of the present invention are described below. However, the present invention is not limited to the following examples.

Examples 1 to 4 and Comparative Examples 1 to 4

Silicon carbide powder (silicon carbide particles) with an average particle diameter of 33 μm and metal silicon powder with an average particle diameter of 5 μm were mixed so that the ratio of the mass of the silicon carbide powder to the total value of the mass of the silicon carbide powder and the mass of the metal silicon powder was 80 mass %. After the addition of compounds containing silicon, aluminum, and an alkaline earth metal, the components were mixed to obtain a raw material mixture.

After the addition of 6 parts by mass of methyl cellulose as an organic binder, 2.5 parts by mass of a surfactant, and 24 parts by mass of water to 100 parts by mass of the raw material mixture, the components were mixed. The mixture was then kneaded for 30 minutes using a vacuum kneader to obtain forming clay. Table 1 shows the ratio of each component ($SiO_2$ content, $Al_2O_3$ content, and alkaline earth metal oxide (XO) content) calculated from values obtained by converting each component (oxide phase component) in the oxide phase obtained after firing, each element contained in the compounds containing silicon, aluminum, and alkaline earth metal, and aluminum, calcium, and the like contained in the metal silicon as impurities into respective oxides, and values obtained by converting the amount of silicon dioxide contained in the oxide film on the surface of the silicon carbide particles and/or the metal silicon from the amount of oxygen determined by chemically analyzing the raw material powder.

method was compared with the X-ray diffraction pattern of a known oxide crystal to determine the crystal type of the oxide phase. In this case, it suffices that only a small peak be confirmed as the X-ray diffraction pattern of the oxide crystal. A phase for which the X-ray diffraction pattern originating in the oxide crystal phase could not be confirmed or a phase for which a broad diffraction originating in an amorphous glass component was confirmed at about θ=20 to 30° was determined as an amorphous phase. In this case, whether or not the amorphous phase includes aluminum may be confirmed by measuring characteristic X-rays specific to aluminum by EDS point analysis or the like of the oxide phase present on the ground surface of the resulting silicon carbide porous body. In the case where an oxide crystal phase and an amorphous phase are formed in a mixed state, the oxide crystal phase which could be identified was determined as the crystal type of the oxide phase for convenience (amorphous phase is not dissolved in acetic acid).

(X-ray Diffraction Measurement Method)

The above predetermined measurement method may be a method of measuring and analyzing the X-ray diffraction pattern of a specimen using a high-resolution powder X-ray diffractometer (HR-XRD) "RINT-2500" manufactured by Rigaku Corporation under predetermined conditions (X-rays: Cu Kα1, tube voltage: 50 kV, tube current: 300 mA, counter: scintillation counter, goniometer: RINT 2000 wide-angle goniometer, attachment: ASC-6S, counter monochro-

TABLE 1

| | Oxide phase component | $Al_2O_3$ content (mol %) | $SiO_2$ content (mol %) | XO content (mol %) | Crystal type of oxide phase |
|---|---|---|---|---|---|
| Example 1 | SrO, $Al_2O_3$, $SiO_2$ | 8.2 | 28.4 | 63.4 | Amorphous |
| Example 2 | SrO, $Al_2O_3$, $SiO_2$ | 35.1 | 26.1 | 38.8 | $SrAl_2Si_2O_8$ |
| Example 3 | MgO, $Al_2O_3$, $SiO_2$ | 41.5 | 23.2 | 35.3 | Cordierite |
| Example 4 | CaO, $Al_2O_3$, $SiO_2$ | 32.4 | 18 | 49.6 | Anorthite |
| Comparative Example 1 | MgO, $Al_2O_3$, $SiO_2$ | 4.8 | 37.8 | 57.4 | Forsterite ($Mg_2SiO_4$) |
| Comparative Example 2 | CaO, $Al_2O_3$, $SiO_2$ | 3.5 | 25.7 | 70.8 | Calcium silicate ($CaSiO_3$) |
| Comparative Example 3 | SrO, $Al_2O_3$, $SiO_2$ | 4 | 29.7 | 66.3 | Strontium silicate ($SrSiO_3$) |
| Comparative Example 4 | SrO, $Al_2O_3$, $SiO_2$ | 55.3 | 14.5 | 30.2 | $SrAl_2Si_2O_8$ |

X: Alkaline earth metal (Sr, Mg, or Ca)

The resulting clay was formed into a honeycomb shape having an outer diameter of 45 mm, a length of 120 mm, a partition wall thickness of 0.43 mm, and a cell density of 100 cells/square inch (16 cells/cm$^2$). The resulting formed product was calcinated at 500° C. for five hours to remove the organic binder in the formed product (debinding), and then fired at 1450° C. for two hours in a non-oxidizing atmosphere to obtain a silicon carbide porous body (Examples 1 to 4 and Comparative Examples 1 to 4). The resulting silicon carbide porous body was subjected to the following evaluations.

(Crystal Type of Oxide Phase)

The crystallization state and the type of the crystal (crystallized substance) of the oxide phase (crystal type of oxide phase) of the resulting silicon carbide porous body (Examples 1 to 4 and Comparative Examples 1 to 4) were identified using X-ray diffraction. The results are shown in Table 1.

Identification Method For Crystal Type of Oxide Phase:

The X-ray diffraction pattern of each silicon carbide porous body obtained by using a predetermined measurement mator: full-automatic monochromator, divergence slit: 1 deg, scattering slit: 1 deg, receiving slit: 0.3 mm, scan mode: continuous, scan speed: 2°/min, scan step: 0.02°, scan axis: 2θ/θ). However, the measurement method is not limited to the above-mentioned measurement method and measurement conditions. It is preferable that the measurement device have a higher resolution.

(Porosity)

The porosity (%) of the resulting silicon carbide porous body (Examples 1 to 4 and Comparative Examples 1 to 4) was measured using an Archimedes method. The results are shown in Table 2.

(Evaluation of Strength)

The strength of the resulting silicon carbide porous body (Examples 1 to 4 and Comparative Examples 1 to 4) was measured using the following method. The results are shown in Table 2.

Strength Measurement Method:

A four-point bending strength at room temperature was measured in accordance with the method described in JIS R1601.

(Evaluation of Acetic Acid Resistance)

The acetic acid resistance of the resulting silicon carbide porous body (Examples 1 to 4 and Comparative Examples 1 to 4) was evaluated. The results are shown in Table 2.

Evaluation Method for Acetic Acid Resistance:

The silicon carbide porous body was immersed in a 10 mass % acetic acid aqueous solution for 30 minutes, and a change in mass before and after immersion was measured. The mass reduction rate (mass %) was calculated using the following equation (1), and taken as the index of the acetic acid resistance. The smaller the mass reduction rate, the more excellent the acetic acid resistance. The results are shown in Table 2. A change in mass may be calculated by determining the quantity of silicate ions such as $SiO_3^{2-}$ and $SiO_4^{4-}$ and alkaline earth metal ions such as $Sr^{2+}$ dissolved in the acetic acid aqueous solution by chemical analysis after the test. The evaluation method for acetic acid resistance is not limited to that described above.

(Mass reduction rate)=((mass before immersion)−(mass after immersion))/(mass before immersion)×100    (1)

Mass before immersion: dry mass before immersing silicon carbide porous body in acetic acid aqueous solution Mass after immersion: dry mass after immersing silicon carbide porous body in acetic acid aqueous solution

TABLE 2

|  | Porosity (%) | Strength (MPa) | Acetic acid resistance (mass %) |
| --- | --- | --- | --- |
| Example 1 | 44 | 30 | 0 |
| Example 2 | 42 | 24 | 0 |
| Example 3 | 46 | 23 | 0 |
| Example 4 | 43 | 28 | 0 |
| Comparative Example 1 | 47 | — | 1.1 |
| Comparative Example 2 | 46 | — | 1.2 |
| Comparative Example 3 | 45 | — | 1.5 |
| Comparative Example 4 | 45 | 15 | 0 |

As shown in Table 2, since formation of an alkaline earth metal silicate crystal phase is inhibited when the content of dialuminum trioxide in the oxide phase is 5.0 mol % or more, the oxide phase is not dissolved in acetic acid. A silicon carbide porous body having high strength and excellent acetic acid resistance is obtained when the content of dialuminum trioxide in the oxide phase is 50 mol % or less.

INDUSTRIAL APPLICABILITY

As described above, since the silicon carbide porous body of the present invention includes the oxide phase in at least a part of each pore, and the oxide phase includes oxides of silicon, aluminum and an alkaline earth metal, and the oxide phase does not substantially include an alkaline earth metal silicate, the oxide phase is not dissolved in an acid (particularly acetic acid) used for loading a catalyst on the body to exhibit improved acid resistance, whereby contamination of a solution (solution in which catalyst is dissolved in acid) used for loading a catalyst on the body is inhibited. According to the method of manufacturing the silicon carbide porous body of the present invention, since the compounds containing silicon, aluminum, and an alkaline earth metal are added so that the value obtained by converting the total amount of aluminum contained in the compounds into the amount of dialuminum trioxide ($Al_2O_3$) containing an equal amount of aluminum is 5.0 mol % or more of the entire oxide phase formed after firing, formation of an alkaline earth metal silicate crystal phase can be inhibited. Since the compounds are added so that the value obtained by converting the total amount of aluminum into the amount of dialuminum trioxide is 50 mol % or less of the entire oxide phase, the eutectic point of the ternary oxide phase can be sufficiently decreased, whereby the strength can be improved. Since the honeycomb structure of the present invention includes the silicon carbide porous body, the acid resistance of the honeycomb structure is improved, whereby contamination of a solution used when causing the honeycomb structure to carry a catalyst can be inhibited.

The invention claimed is:

1. A silicon carbide porous body, in which silicon carbide particles as an aggregate and metal silicon as a bonding material are bonded so that pores are formed between the silicon carbide particles, the silicon carbide porous body comprising an oxide phase in at least a part of each pore,
   wherein the oxide phase includes oxides of silicon, aluminum and an alkaline earth metal, and the oxide phase does not substantially include an alkaline earth metal silicate crystal phase,
   and wherein the oxide of aluminum is dialuminum trioxide ($Al_2O_3$) in an amount of 5.0 to 50.0 mol % of the entire oxide phase in molar ratio.

2. The silicon carbide porous body as defined in claim 1, wherein the oxide phase is provided on a surface of the silicon carbide particles and/or a surface of the metal silicon.

3. The silicon carbide porous body as defined in claim 1, wherein the oxide of silicon is silicon dioxide ($SiO_2$), and the oxide of an alkaline earth metal is calcium oxide (CaO) or strontium oxide (SrO).

4. The silicon carbide porous body as defined in claim 2, wherein the oxide of silicon is silicon dioxide ($SiO_2$), and the oxide of an alkaline earth metal is calcium oxide (CaO) or strontium oxide (SrO).

5. The silicon carbide porous body as defined in claim 1, wherein the oxide phase includes silicon dioxide, dialuminum trioxide, and the oxide of an alkaline earth metal, the oxide phase being an amorphous phase or a crystal phase including dialuminum trioxide in a crystal structure.

6. The silicon carbide porous body as defined in claim 5, wherein the crystal phase includes cordierite, anorthite, or strontium feldspar ($SrAl_2Si_2O_8$).

7. A honeycomb structure comprising a silicon carbide porous body, in which silicon carbide particles as an aggregate and metal silicon as a bonding material are bonded so that pores are formed between the silicon carbide particles, the silicon carbide porous body comprising an oxide phase in at least a part of each pore,
   wherein the oxide phase includes oxides of silicon, aluminum and an alkaline earth metal, and the oxide phase does not substantially include an alkaline earth metal silicate crystal phase,
   and wherein the oxide of aluminum is dialuminum trioxide ($Al_2O_3$) in an amount of 5.0 to 50.0 mol % of the entire oxide phase in molar ratio.

8. A method of manufacturing a silicon carbide porous body, the method comprising: adding compounds containing silicon, aluminum, and an alkaline earth metal to silicon carbide particles and metal silicon to obtain a raw material, forming the resulting raw material into a predetermined shape, and calcinating and firing the resulting formed product to obtain a porous body including an oxide phase including oxides of silicon, aluminum, and an alkaline earth metal, on at least a part of a surface of the silicon carbide particles and/or the metal silicon and having a content of dialuminum trioxide ($Al_2O_3$) of 5.0 to 50.0 mol % of the entire oxide phase in molar ratio.

* * * * *